(12) United States Patent
Schartner et al.

(10) Patent No.: US 10,556,289 B2
(45) Date of Patent: Feb. 11, 2020

(54) WELDING TYPE POWER SUPPLY FOR TIG STARTS

(71) Applicant: Illinois Tool Works Inc., Glenview, IL (US)

(72) Inventors: Quinn W. Schartner, Kaukauna, WI (US); Bernard J. Vogel, Troy, OH (US); Andrew D. Nelson, Grand Chute, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1253 days.

(21) Appl. No.: 14/535,917

(22) Filed: Nov. 7, 2014

(65) Prior Publication Data

US 2016/0129514 A1    May 12, 2016

(51) Int. Cl.
    *B23K 9/067*    (2006.01)
    *B23K 9/09*     (2006.01)
    *B23K 9/10*     (2006.01)

(52) U.S. Cl.
    CPC ............ *B23K 9/0677* (2013.01); *B23K 9/092* (2013.01); *B23K 9/1031* (2013.01)

(58) Field of Classification Search
    CPC ....... B23K 9/0956; B23K 9/0953; B23K 9/10
    USPC .................................. 219/130, 131, 132, 135
    See application file for complete search history.

(56) References Cited

U.S. PATENT DOCUMENTS

| | | | | |
|---|---|---|---|---|
| 3,609,291 A | * | 9/1971 | Pilia | B23K 9/1087 219/132 |
| 4,417,129 A | * | 11/1983 | Young | B23K 9/0678 219/130.32 |
| 6,034,350 A | | 3/2000 | Heraly et al. | |
| 8,455,794 B2 | * | 6/2013 | Vogel | H02M 3/157 219/110 |
| 2004/0074884 A1 | | 4/2004 | Butler et al. | |
| 2004/0238511 A1 | | 12/2004 | Matus et al. | |
| 2011/0011842 A1 | * | 1/2011 | Thomas | B23K 9/1043 219/130.21 |
| 2014/0021180 A1 | | 1/2014 | Vogel | |

OTHER PUBLICATIONS

International Search Report, dated Feb. 9, 2016, European Patent Office, Rijswijk, Netherlands.

* cited by examiner

*Primary Examiner* — Tu B Hoang
*Assistant Examiner* — Thomas J Ward
(74) *Attorney, Agent, or Firm* — George R. Corrigan

(57) ABSTRACT

A method and apparatus for TIG welding and starting a TIG welding process includes limiting the pulse width of a power circuit when a TIG start is being performed, and monitoring for the creation of a welding arc. After the welding arc has been detected the limiting of the pulse width is ended.

9 Claims, 1 Drawing Sheet

WELDING TYPE POWER SUPPLY FOR TIG STARTS

FIELD OF THE INVENTION

The present disclosure relates generally to the art of welding type power supplies. More specifically, it relates to starting a TIG process using a welding type power supply.

BACKGROUND OF THE INVENTION

There are many different welding processes. One welding process is a TIG process. Tungsten inert gas (TIG) welding is an arc welding process that uses a non-consumable tungsten electrode to produce the weld. The weld area is protected from atmospheric contamination by an inert shielding gas (argon or helium), and a filler metal is typically used. TIG welding is usually performed using CC (current controlled) power. Welding type power supply, as used herein, is a power supply that provides welding type power. Welding type power, as used herein, is power suitable for welding, induction heating, or plasma cutting.

There are many different topologies used in welding type power supplies. Switched power supplies are often used to allow for output control. One prior art welding type power supply includes a preregulator, a high voltage split bus, and a stacked inverter output, and is shown in patent application Ser. No. 13/839,235, published as US-2014-0021180-A1, hereby incorporated by reference. This power supply is well suited for controlling the output using pulse width modulation of the output inverters. Another prior art welding type power supply well suited for pwm control of the output is described in U.S. Pat. No. 8,455,794, also incorporated by reference.

Starting a TIG weld can require skill. Typical methods of starting a TIG process include using HF, lift art, and scratch start. Lift starts require specific controls, and the user touches the arc to the workpiece. As the electrode is lifted the arc is struck. HF starts are easy and reliable, but can cause interference with other equipment and requires the machine have the capability of providing an HF output. Scratch start requires no extra equipment, but requires the most skill. Scratch start involves sweeping the tungsten across the work piece.

TIG starts can "stick" and leave tungsten on the workpiece. This is particularly a problem for non-HF starts, and most particularly a problem for scratch starts. One cause of sticking is current overshoot during arc initiation. Current overshoot can happen because the power supply has a fast output current slew rate (this may be desirable at times other than the start and for other processes). Accordingly, a welding type power supply that provides reliable starts for TIG welding, while not sacrificing a fast slew rate after starting, is desired.

SUMMARY OF THE PRESENT INVENTION

According to a first aspect of the disclosure a method of starting a TIG welding process includes limiting the pulse width of a power circuit when a TIG start is being performed, and monitoring for the creation of a welding arc. After the welding arc has been detected the limiting of the pulse width is ended.

According to a second aspect of the disclosure a welding type power supply includes a switched power circuit and a controller. The switched power circuit receives input power and provides welding type power to a welding output. The power circuit has a control input. The a controller includes a control output connected to the control input, and a feedback input that receives feedback indicative of the presence or absence of an arc. A pwm module is connected to the control output, and a pulse width limiting module is connected to limit the pwm module. The pwm module is responsive to the feedback input.

The ending of the limiting of the pulse width is delayed after the welding arc has been detected, in one alternative.

The delay to end the limiting of the pulse width is a fixed period of time, in another alternative.

The delay to end the limiting of the pulse width is one millisecond in one embodiment.

Closed loop control of the output is provided after the limiting of the pulse width has ended, in various embodiments.

Limiting the pulse width includes providing an output voltage of about 10 volts, in one alternative.

The TIG process is started using a scratch start in another alternative.

A feedback circuit is connected to the welding output and connected to the feedback input in one embodiment.

A delay module is included and the pulse width limiting module is responsive to the delay module in various embodiments.

The delay module is responsive to the feedback input, in one alternative.

The delay module is a fixed time delay module in another alternative.

The delay module is a one millisecond delay module. in one embodiment.

Other principal features and advantages of will become apparent to those skilled in the art upon review of the following drawings, the detailed description and the appended claims.

Figure 1:
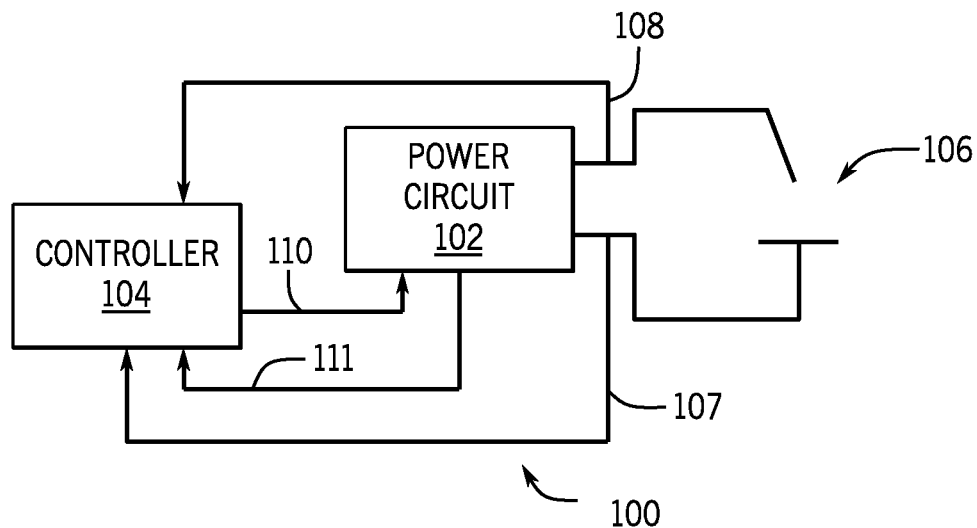
FIG. 1 is a block diagram of a welding type power supply.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to particular welding type power circuits, controllers, modules and components, it should be understood at the outset that the invention can also be implemented with other welding type power circuits, controllers, modules and components.

Generally, the present invention provides for using PWM control of the output of a welding type power supply to provide a desirable start for TIG welding. A welding type power supply 100 (FIG. 1) includes, in the preferred embodiment, a power circuit 102 and a controller 104. The output of power circuit 104 is a welding arc 106. Power supply 100 may be a multi-process welding type power supply, but the present invention will be explained with reference to a TIG mode of operation.

Controller 104 is preferably a digital pulse width controller, such as that described in U.S. Pat. No. 8,455,794. Controller 104 may also be such as that described in US-2014-0021180-A1. Alternatives provide for an analog controller, a digital controller with discrete elements, a controller using DSPs, and a controller using other circuitry.

Power circuit 102 is preferably the power circuit shown in US-2014-0021180-A1, which includes a preregulator, a high voltage split bus, and, as an output converter, a stacked full bridge inverter output circuit. It may also be implemented using the power circuit shown in U.S. Pat. No. 8,455,794. Alternatives provide for using the output circuit (stacked inverters) without the preregulator, a half bridge output converter, or other output converters, such as a chopper, buck, etc., and using intermediates stages.

Feedback is provided from power circuit 102 on lines 111, and from the output on lines 107 and 108. The feedback may be indicative of the bus parameters (current, voltage, ripple, etc.), and may be indicative of the output parameters (current, voltage, power polarity, etc.), and may be indicative of the presence or absence of the arc (for example sensing current or voltage). Control signals are received by power circuit 102 on lines 110. The control signals received on 110 control the switching of switches in power circuit 102, including preregulator and output converter switches.

Figure 2:
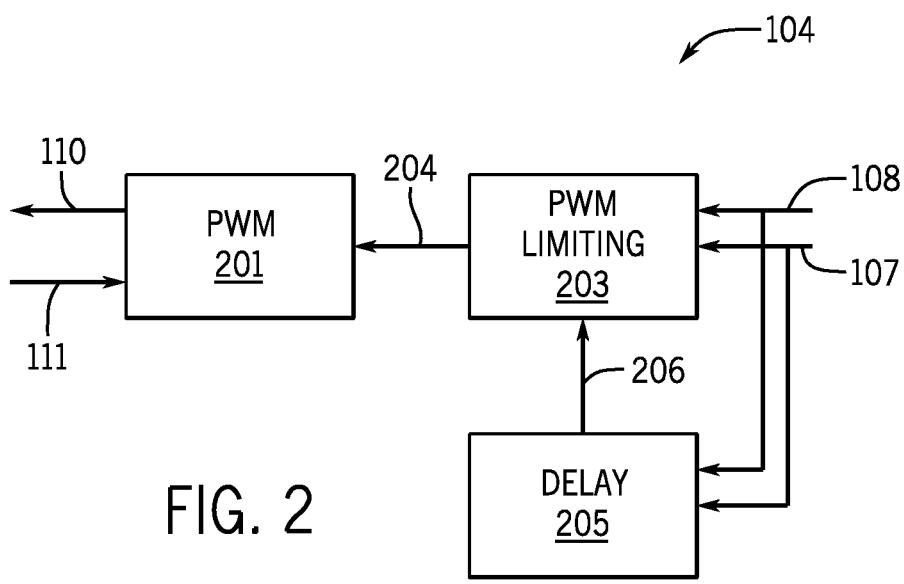
FIG. 2 is a block diagram of the controller for the welding type power supply of FIG. 1.

Controller 104, shown in FIG. 2, includes a PWM module 201 that receives feedback of the output of power circuit 102 (or feedback from within power circuit 102). In response to this feedback controller 104 and PWM module 201 pulse width modulates switches in power circuit 102 so that the output is a desired output. PWM module, as used herein is a module that controls the pulse width of a power circuit, so as to provide a desired output. Module, as used herein includes software and hardware that cooperate to perform a given function.

When the user selects the TIG mode of operation (or if it is a dedicated TIG machine), controller 104 and PWM module 201 cause the output of welding type power supply 10 to be a cc (current controlled) output at a user setpoint. Also, when the TIG process is initiated the preferred embodiment limits current overshoot to reduce the likelihood of tungsten electrode sticking during arc initiation. The invention limits current overshoot by limiting the slew rate, and specifically, limits the pulse width to enable better control of the output current slew rate during arc initiation. Preferably the duty cycle is limited to a pulse width that results in about 10V or less under load until an arc voltage is detected (meaning the start is over). One embodiment delays closed loop control for 1 ms after the arc is detected, to insure the arc is stable before ending the limited pulse width. The arc can be detected by monitoring output voltage, current, or both an comparing the detected parameter to a threshold or value. Alternatives use a longer or shorter delay than 1 msec.

Controller 104 provides for the desirable TIG start using a pulse width limiting module 203, which limits the pulse width to slow the slew rate of the output, and the output is less than that which would be provided but for module 203. This makes sticking during a TIG start less likely. Pulse width limiting module 203 limits the output to about 10 volts, in the preferred embodiment. About 10 volts, as used herein, is an average of 8-12 volts. Pulse width limiting module, as used herein, is a module that controls the pulse width of a power circuit, so as to limit the pulse width to be less than the pulse width that would be provide absent the pulse width limiting module (i.e., less than the pulse width called for by the normal control).

Pulse width limiting module 203 receives feedback signals on inputs 107 and 108 that are indicative of the presence or absence of the arc (if current is used, then only one feedback line could be used). At start up (when current is drawn, e.g.) pulse width limiting module 203 is activated, limiting the pulse width set by pwm module 201. Then, when the feedback signals 107/108 indicate the arc is established, pulse width limiting module 203 is deactivated, in one embodiment. The preferred embodiment uses a voltage threshold to determine when the arc is present. For example, a voltage of less than 10 volts could be used to indicate the arc has not been established. Other threshold may be used. Various alternatives provide for using current, voltage, or a combination thereof to determine when an arc is established.

In another embodiment a delay module 205 also receives feedback signals 107/108, and delays the deactivation of pulse width limiting module 203. Delay module 205 can also be connected to pwm module 201. Delay module, as used herein, is a module that causes a delay from the time an event is sensed, to the time when there is a change in a command. Delay module 205 is a fixed time delay module in one embodiment. Fixed time delay module, as used herein is a module that causes a delay of a fixed time from a sensed event to a change in a command. Delay module 205 is a one millisecond delay module, in another embodiment. One millisecond delay module, as used herein, is a module that causes a delay of one millisecond from a sensed event to a change in a command.

The preferred embodiment provides that the control modules are implemented in software using a digital pwm controller such as that in U.S. Pat. No. 8,455,794. Alternatives provide for hardware to implement the control modules. The preferred embodiment provides that the TIG start is done using a scratch start, although it may be done with lift and HF starts.

Numerous modifications may be made to the present disclosure which still fall within the intended scope hereof. Thus, it should be apparent that there has been provided a method and apparatus for providing welding type power for starting a TIG process and for welding that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The invention claimed is:

1. A method of starting a TIG welding process, comprising:
    limiting the pulse width of a power circuit to be less than a desired magnitude when a TIG start is being performed;
    monitoring for the creation of a welding arc; and
    ending limiting the pulse width after the welding arc has been detected.

2. The method of claim 1, further comprising delaying ending limiting the pulse width after the welding arc has been detected.

3. The method of claim 1, further comprising delaying ending limiting the pulse width after the welding arc has been detected for a fixed period of time.

4. The method of claim 1, further comprising delaying ending limiting the pulse width after the welding arc has been detected for at least one millisecond.

5. The method of claim 2, further comprising providing a closed loop control after ending limiting of the pulse width.

6. The method of claim 5, wherein limiting the pulse width includes providing an output voltage of about 10 volts.

7. The method of claim 6, wherein limiting the pulse width of a power circuit is done when a TIG scratch start is being performed.

8. The method of claim 1, wherein monitoring includes monitoring the output voltage.

9. The method of claim 1, wherein monitoring includes monitoring the output current.

* * * * *